Patented Apr. 12, 1949

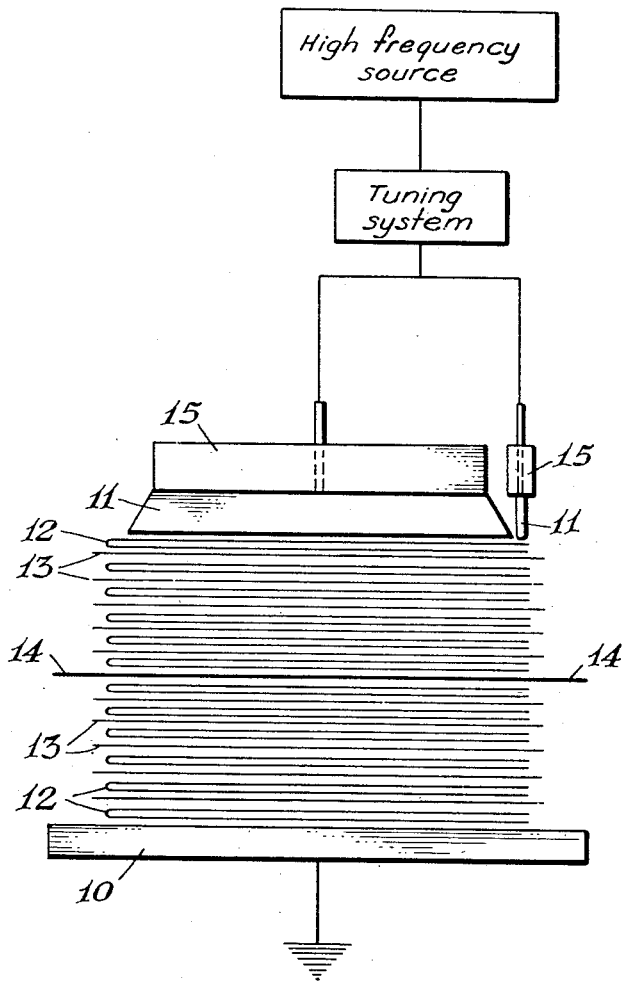

2,467,133

UNITED STATES PATENT OFFICE 2,467,133

HIGH-FREQUENCY ELECTRIC FIELD HEATING TO PRODUCE UNIFORM WELDS IN A STACK OF ORGANIC THERMOPLASTIC FILMS

Carroll R. Irons, Midland, Mich., assignor to The Dow Chemical Company, Midland, Mich., a corporation of Delaware Application August 31, 1946, Serial No. 694,254

2 Claims. (Cl. 154—126)

This invention relates to a method of producing welds simultaneously in a plurality of organic thermoplastic films. More specifically, it relates to a method for producing, at the same time, a plurality of welded or sealed tubes, pouches, or envelopes from a stack of film sheets.

It is common practice to form hollow articles by sealing or welding lapped edges of double or folded sheets of organic thermoplastic film material. Thus, when a sheet is folded longitudinally, and the matched edges are sealed, a tube is produced. If such a tube is sealed transversely at intervals along its length, a connected series of closed packages is obtained. The preparation of these and other types of sealed articles from plastic films has been accomplished using adhesives, externally applied heat, or both, or by high frequency electrostatic welding operations.

In order to increase the productive capacity of the equipment used in making welded articles from organic thermoplastic films, attempts have been made to submit a stack of such double films, each of which is arranged suitably for the formation of the desired article, to the action of a single pair of heating elements or of high frequency welding electrodes. Such attempts have been unsuccessful with most films, when using heat sealing means, because the layers of film nearest the heating elements, i. e. those on top and at the bottom of the stack, have been greatly overheated before those in the center have softened enough to be sealed. This condition is aggravated by the necessity of inserting slip-sheets, such as paper or regenerated cellulose, between the individual film articles in the stack. Similarly, it has been found that there is a limit to the number of stacked film articles which can be welded simultaneously using a high frequency field. The articles in or near the center of such a stack are sealed first, and if the stack is too thick, these articles become over-heated by the continued excitation from the field before the top and bottom articles are heated sufficiently. The precise limit as to the number of sheets of film which can be welded simultaneously is a variable which depends upon the nature of the film, its fusion temperature, its individual and aggregate thicknesses, the intensity of the field, and other factors. It is sufficient for the present purposes to state that, when this limit is reached in normal operations, the equipment is still operating at less than half its possible efficiency.

It is accordingly among the objects of the present invention to provide a method for utilizing more fully than has heretofore been possible the field in a high frequency welding apparatus, applied to the simultaneous welding of a stack of organic thermoplastic films. A related object is to provide a method whereby each of a plurality of pairs of lapped films in a stack may be welded simultaneously with substantially equivalent results all the way from the center to the top and bottom of such stack. Other objects may appear from the following description.

It has now been found that an unexpectedly high efficiency can be obtained, and that comparable results as to weld strength and appearance are produced at all levels in a stack of paired organic thermoplastic films, when there is inserted into such a stack, near its center, a sheet of metal of a size at least great enough to cover the intended weld area, and preferably great enough to protrude from the stack, and the so-formed stack of films with a metallic insert is subjected to a high frequency electric field. It is understood, of course, that the usual type of slip-sheets are included in the stack between such of the layers of films as are not to be welded to one another, as otherwise all layers might become fused along the weld line into a single multi-foliate structure. The preferred metallic insert is a thin sheet of tin, lead or aluminum, suitably in the form of foil, and may be either plain metal or paper-backed metal foil, as desired.

The invention may be understood more readily by reference to the accompanying drawing, wherein the single diagrammatic figure represents an elevation of a stack of folded organic thermoplastic films being subjected to a high frequency electric field to form welded side and end closures on film pouches. In the said drawing, wherein the spacing is greatly exaggerated for clarity, a grounded plate 10 forms the lower electrode which co-operates with suspended bar electrodes 11 in the welding operation carried out on folded and stacked sheets 12 of organic thermoplastic film. Each pair of film sheets 12 is separated from its neighbors by a slip-sheet 13, which may be paper or regenerated cellulose or any other convenient dielectric having different dielectric properties than the film 12. Near the center of the stack, and preferably, but not necessarily, extending beyond the edges of the stacked films 12, is inserted a sheet of metal foil 14. Upper electrodes 11, the working surfaces of which, in contact with the top of the stack, are of a size and shape to produce the desired weld, are supported, by means not shown attached to insulating blocks 15, and are electrically connected to a high frequency source through a suitable tuning system of known type (either variable capacity or variable inductance). Metal foil 14 is neither grounded nor connected electrically either to the high frequency source or to any other metal part of the equipment, and hence does not serve as an additional electrode. Neither does it function as a heating surface, as do metal plates sometimes used in magnetic induction heating systems. It appears to affect the capacity of the stack of dielectric sheets, however, and serves to dissipate excess heat from the center of the stack, preferably by radiation to the atmosphere from its exposed, protruding edges.

In a specific example, it was desired to make a plurality of welded pouches 3.5 inches wide by 2.75 inches deep from sheets of a copolymer of about 90 per cent vinylidene chloride and about 10 per cent vinyl chloride. The sheets were each about 2 mils thick, and had a fusion temperature of about 175° C. It was found that when a stack of 25 double sheets of this material, with suitable slip-sheets, was placed between suitably shaped electrodes, and pressed moderately to form welds upon fusion of the plastic, and the whole was subjected to a high frequency electric field of about 35–40 megacycles per second from a 200-watt source, several of the paired sheets at and near both the top and bottom of the stack were not welded, even if the stack was left in the field until the double sheets near its center began to decompose from prolonged excitation. In fact, with this material, it was found that no more than four double sheets (8 single thicknesses) of the film 2 mils thick could be welded satisfactorily at the same time under the heretofore standard conditions. When, however, a sheet of tinfoil, 0.0005 inch thick and about 5 inches square, was inserted near the center of the stack with its edges protruding, and the new assembly was subjected to the same electric field, all of the pairs of plastic films were welded within 1 to 2 minutes and before any of the films had shown signs of decomposition, and the welds in the top and bottom pairs were as strong as those from other positions in the pile. In a similar manner, 50 double sheets of the same film were stacked with a sheet of lead foil 4 mils thick near the center of the stack. All pairs of films in this stack were welded in about 2.5 minutes, without decomposition, using the same 200-watt high frequency source at about 35 to 40 megacycles per second. This size stack appeared to approach the limit for the particular film employed in the available apparatus.

Similarly advantageous results are obtained with other organic thermoplastic films, when treated in the manner described. The metal foil employed may vary as to thickness and may be any of several compositions. The most practical of the readily available materials appear to be tinfoil, leadfoil and aluminum foil, and, while any thickness of such metal may be used, no advantage is found in employing a metal sheet over about 10 mils thick. Tinfoil may be used at thicknesses under 1 mil. Thin sheets of iron or steel, copper, nickel, magnesium or other metal may be used if desired, in thicknesses up to 0.1 inch or more.

The identity of the organic thermoplastic film employed, and the particular type of high frequency welding equipment used, form no part of the present invention, as any high frequency welding equipment may be used and on any organic thermoplastic film—the invention residing in the use of the metal sheet as herein described.

Reference has been made herein to "double" or "paired" organic thermoplastic film. This is not intended to limit the method to use on two separate films of the same size and shape, but has reference to the necessity for having two or more portions of the same or different films overlying one another if a weld is to be produced. In the intended weld area, then, the films may be deemed to be double, even though there are but single thicknesses outside of this area.

I claim:

1. The method which comprises stacking a plurality of double sheets of organic thermoplastic film to be welded, with interposed slip-sheets, inserting near the center of the so-formed stack a thin metal foil covering the intended weld area of contiguous films and protruding from the stack into the atmosphere, subjecting the assembly to a high frequency electric field of an intensity known to weld such films, between electrodes of the size and shape to produce the desired welds, until all pairs of films are welded, and removing the welded articles from the electrostatic field, the said metal sheet being isolated physically and electrically from the metal parts of the apparatus employed, and from the ground.

2. The method as claimed in claim 1, wherein the thin metal sheet is tinfoil, less than about 1 mil thick.

CARROLL R. IRONS.

REFERENCES CITED

The following references are of record in the file of this patent:

UNITED STATES PATENTS

| Number | Name | Date |
|---|---|---|
| 2,087,480 | Pitman | July 20, 1937 |
| 2,109,323 | Smith | Feb. 22, 1938 |
| 2,232,062 | Gurwick | Feb. 18, 1941 |
| 2,232,640 | Schwartzman | Feb. 18, 1941 |
| 2,259,239 | Brown et al. | Oct. 14, 1941 |
| 2,307,344 | Zottu | Jan. 5, 1943 |
| 2,352,520 | Dawson | June 27, 1944 |